United States Patent Office 2,909,448
Patented Oct. 20, 1959

2,909,448

SALTS OF POLYAMINE POLYEPOXIDE ADDUCTS AND THEIR USE AS CURING AGENTS FOR POLYEPOXIDES

Carl W. Schroeder, Orinda, Calif., assignor to Shell Development Company, New York, N.Y., a corporation of Delaware No Drawing. Application March 7, 1955
Serial No. 492,805

2 Claims. (Cl. 117—141)

This invention relates to a new class of amine salts. More particularly, the invention relates to a new salts of polyamine-polyepoxide adducts, to a method for their preparation, and to the use of the new salts, particularly as curing agents for polyepoxides.

Specifically, the invention provides new salts of (1) acids, and particularly weak organic and inorganic acids, and (2) preformed soluble adducts of polyamines and polyepoxides, such as, for example, a preformed soluble adduct of diethylene triamine and a diglycidyl ether of 2,2-bis(4-hydroxyphenyl) propane. The invention further provides a method for using these salts as curing agents for polyepoxides which process comprises contacting the polyepoxide with the above-described salts and heating to effect cure. As a special embodiment, the invention provides a method for using the above-described salts as curing agents in the treatment of fabrics, and particularly wool-containing fabrics, with certain polyepoxides to reduce their tendency to shrink and to improve their water repellency.

I have recently found that dimensional stability can be imparted to wool without affecting the feel and hand of the fabric by impregnating the wool with an aqueous medium containing a polyether polyepoxide and an amine catalyst, such as diethylene triamine, and heating to effect cure. This process is superior to known methods for imparting dimensional stability to wool in that it gives higher shrink proof values, better resistance to cleaning and can be applied to white goods without fear of discoloration on subsequent treatment.

There has been, however, several difficulties encountered in adapting the above-described discovery to commercial use. One problem has been with the pot life of the impregnating solution. The polyether polyepoxide-amine combinations employed heretofore have a pot life of only a few hours, and this is not sufficient for many commercial operations. Secondly, the highest dimensional stability has been obtained heretofore mainly with the more expensive aliphatic-type polyether polyepoxides, and for economic reasons it would be highly desirable to find some means by which the high dimensional stability can be obtained with the less expensive reactants, such as the glycidyl polyethers of the polyhydric phenols.

It is, therefore, an object of the invention to provide a new class of materials that may be used as curing agents for polyepoxides. It is a further object to provide new salts of polyamine-polyepoxides adducts that are particularly effective as curing agents for polyepoxides. It is a further object to provide new salts of polyamine-polyepoxides adducts that are especially effective as curing agents in the treatment of wool-containing fabrics with polyether polyepoxides to reduce their tendency to shrink and to improve their water repellency. It is a further object to provide new salts of polyamine-polyepoxide adducts which form with polyepoxides solutions having exceptionally long pot life. It is a further object to provide new salts of polyamine-polyepoxide adducts that permit the use of the less expensive polyether polyepoxides in the treatment of wool-containing fabrics. It is a further object to provide a new method for treating wool-containing fabrics to improve their dimensional stability and improve their water repellency. Other objects and advantages of the invention will be apparent from the following detailed description thereof.

It has now been discovered that these and other objects may be accomplished in part by the novel amine salts of the present invention comprising salts of (1) acids, and particularly weak organic and inorganic acids, and (2) preformed soluble adducts of polyamines and polyepoxides. It has been found that these particular salts possess unobvious beneficial properties, particularly as curing agents for polyepoxides. These salts are especially superior as curing agents for the polyepoxides because they effect a very rapid rate of cure of the polyepoxides at the elevated temperatures to form hard chemical resistant product, yet they show little or no activity with the polyepoxides at or near room temperature, and mixtures of the salts and polyepoxides may be stored for long periods of time without losing their ability to be subsequently cured at the higher temperatures. This long pot life makes the compositions particularly suitable for use for commercial operations where periods of many hours must elapse between the time of preparation and the time of utilization of the curable compositions. The above-described special salts are also particularly superior as curing agents because they are able to effect a very rapid rate of cure with the less expensive polyepoxides, such as the glycidyl polyether of polyhydric phenols, which are more difficult to cure than the aliphatic polyepoxides.

The above-described unobvious properties make the new salts particularly suited for use as curing agents in the above-described process for treating fabrics, and particularly wool-containing fabrics, with polyether polyepoxides to reduce their tendency to shrink and to improve their water repellency. The new salts not only have the desired properties of longer pot life and ability to cure the less expensive glycidyl polyethers of polyhydric phenols while dispersed in the fibers of the fabrics, but they also permit one to obtain much higher shrink proof values and better water repellency than could be obtained heretofore with the simple amine curing agents.

The soluble adducts used in preparing the novel salts of the present invention comprise the reaction products of a polyamine and a polyepoxide. The polyamines used in producing the adducts comprise those amines having a plurality of amino groups, at least one of which is a primary amino group, i.e. an amino nitrogen attached to two hydrogen atoms. These polyamines may be aliphatic, cycloaliphatic or aromatic and may be saturated or unsaturated. Examples of the polyamines include, among others, ethylene diamine, 1,4-butanediamine, 1,6-hexanediamine, o-, p- and m-phenylenediamine, 1,8- octanediamine, 3,3 - diphenyldiamine, 1,4 - naphthalinediamine, 1,2,3-benzenetriamine, diethylene triamine, tripropylene tetramine, triethylene tetramine, heptaethylene octamine, 1,2-diamino-2-methylpropane, 2,3-diamino-2-methylbutane, 2,4-diamino-2-methylpentane, 2,3-diamino-2,3 - dimethylbutane, 2,5-diamino - 2,5 - dimethyl-hexane, 2,6-diamino-2,6-dimethylheptane and the like.

Preferred polyamines to be used in preparing the adducts comprise the aliphatic and aromatic diamines containing no more than 24 carbon atoms, and more particularly amines of the formulae

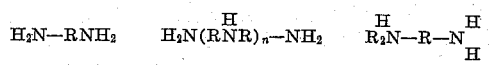

wherein R is a divalent hydrocarbon radical, and $R_2$ is a monovalent hydrocarbon radical, and preferably aliphatic and aromatic hydrocarbon radicals containing no more than 18 carbon atoms, and $n$ is an integer, preferably from 1 to 8.

The polyepoxides used in preparing the preformed adducts comprise those compounds having at least two epoxy groups, i.e. at least two

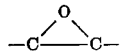

groups. The polyepoxides may be saturated or unsaturated, aliphatic, cycloaliphatic, aromatic or heterocyclic and may be substituted if desired with substituents, such as chlorine atoms, hydroxyl groups, ether radicals, and the like. They may also be monomeric or polymeric.

For clarity, many of the polyepoxides and particularly those of the polymeric type will be described throughout the specification and claims in terms of epoxy equivalent value. The meaning of this expression is described in U.S. 2,633,458.

If the polyepoxide material consists of a single compound and all of the epoxy groups are intact, the epoxy equivalency will be integers, such as 2, 3, 4 and the like. However, in the case of the polymeric type polyepoxides many of the materials may contain some of the monomeric monoepoxides or have some of their epoxy groups hydrated or otherwise reacted and/or contain macromolecules of somewhat different molecular weight so the epoxy equivalent values may be quite low and contain fractional values. The polymeric material may, for example, have epoxy equivalent values, such as 1.5, 1.8, 2.5, and the like.

Examples of the polyepoxides include, among others, epoxidized triglycerides as epoxidized glycerol trioleate and epoxidized glycerol trilinoleate, the monoacetate of epoxidized glycerol dioleate, 1,4-bis(2,3-epoxypropoxy) benzene, 1,3-bis(2,3-epoxypropoxy)benzene, 4,4'-bis(2,3-epoxypropoxy)diphenyl ether, 1,8-bis(2,3-epoxypropoxy)-octane, 1,4-bis(2,3-epoxypropoxy)cyclohexane, 4,4'-bis (2-hydroxy-3,4' - epoxybutoxy)diphenyldimethylmethane, 1,3-bis(4,5-epoxypentoxy)-5-chlorobenzene, 1,4-bis(3,4-epoxybutoxy)-2-chlorocyclohexane, 1,3-bis(2-hydroxy-3,4-epoxybutoxy)benzene, 1,4-bis and (2-hydroxy-4,5-epoxypentoxy)benzene.

Other examples include the epoxy polyethers of polyhydric phenols obtained by reacting a polyhydric phenol with a halogen containing epoxide or dihalohydrin in the presence of an alkaline medium. Polyhydric phenols that can be used for this purpose include among others resorcinol, catechol, hydroquinone, methyl resorcinol, or polynuclear phenols, such as 2,2-bis(4-hydroxyphenyl) propane (Bisphenol A), 2,2-bis(4-hydroxyphenyl) butane, 4,4'-dihydroxybenzophenone, bis(4-hydroxyphenyl) ethane, 2,2-bis(4-hydroxyphenyl)pentane, and 1,5-dihydroxynaphthalene. The halogen-containing epoxides may be further exemplified by 3-chloro-1,2-epoxybutane, 3-bromo-1,2-epoxyhexane, 3-chloro-1,2-epoxyoctane, and the like.

The monomer products produced by this method from dihydric phenols and epichlorohydrin may be represented by the general formula

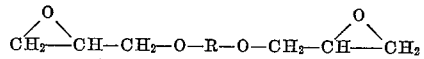

wherein R represents a divalent hydrocarbon radical of the dihydric phenol. The polymeric products will generally not be a single simple molecule but will be a complex mixture of glycidyl polyethers of the general formula

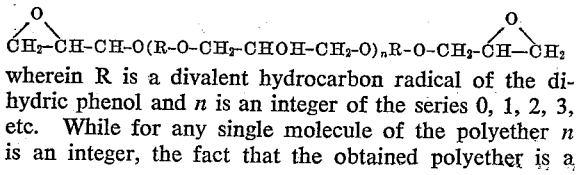

wherein R is a divalent hydrocarbon radical of the dihydric phenol and $n$ is an integer of the series 0, 1, 2, 3, etc. While for any single molecule of the polyether $n$ is an integer, the fact that the obtained polyether is a mixture of compounds causes the determine value for $n$ to be an average which is not necessarily zero or a whole number. The polyethers may in some cases contain a very small amount of material with one or both of the terminal glycidyl radicals in hydrated form.

The aforedescribed preferred glycidyl polyethers of the dihydric phenols may be prepared by reacting the required proportions of the dihydric phenol and the epochlorohydrin in an alkaline medium. The desired alkalinity is obtained by adding basic substances, such as sodium or potassium hydroxide, preferably in stoichiometric excess to the epichlorohydrin. The reaction is preferably accomplished at temperatures within the range of from 50° C. to 150° C. The heating is continued for several hours to effect the reaction and the product is then washed free of salt and base.

The preparation of some of the glycidyl polyethers of dihydric phenols will be illustrated below. Unless otherwise specified, parts indicated are parts by weight.

PREPARATION OF GLYCIDYL POLYETHERS OF DIHYDRIC PHENOLS

Polyether A

About 2 moles of 2,2-bis(4-hydroxyphenyl)propane was dissolved in 10 moles of epichlorohydrin and 1% to 2% water added to the resulting mixture. The mixture was then brought to 80° C. and 4 moles of solid sodium hydroxide added in small portions over a period of about 1 hour. During the addition, the temperature of the mixture was held at about 90° C. to 110° C. After the sodium hydroxide had been added, the water formed in the reaction and most of the epichlorohydrin was distilled off. The residue that remained was combined with an approximately equal quantity by weight of benzene and the mixture filtered to remove the salt. The benzene was then removed to yield a viscous liquid having a viscosity of about 150 poises at 25° C. and a molecular weight of about 350 (measured ebullioscopically in ethylene dichloride). The product had an epoxy value eq./100 g. of 0.50 so the epoxy equivalency was 1.75. For convenience, this product will be referred to hereinafter as Polyether A.

Polyether B

A solution consisting of 11.7 parts of water, 1.22 parts of sodium hydroxide, and 13.38 parts of 2,2-bis(4-hydroxyphenyl)propane was prepared by heating the mixture of ingredients to 70° C. and then cooling to 46° C. at which temperature 14.06 parts of epichlorohydrin was added while agitating the mixture. After 25 minutes had elapsed, there was added during an additional 15 minutes' time a solution consisting of 5.62 parts of sodium hydroxide in 11.7 parts of water. This caused the temperature to rise to 63° C. Washing with water at a temperature of 20° C. to 30° C. was started 30 minutes later and continued for 4½ hours. The product was dried by heating to a final temperature of 140° C. in 80 minutes, and cooled rapidly. At room temperature, the product was an extremely viscous semi-solid having a melting point of 27° C. by Durrans' Mercury Method and a molecular weight of 483. The product had an epoxy value eq./100 g. of 0.40. For convenience, this product will be referred to as Polyether B.

Polyether C

About 228 parts of 2,2-bis(4-hydroxyphenyl)propane and 84 parts sodium hydroxide as a 10% aqueous solution were combined and heated to about 45° C. whereupon 176 parts of epichlorohydrin was added rapidly. The temperature increased and remained at about 95° C. for 80 minutes. The mixture separated into a two-phase system and the aqueous layer is drawn off. The resinous layer that remained is washed with hot water and then drained and dried at a temperature of 130° C. The Durrans' Mercury Method melting point of the resulting product is 52° C. and the molecular weight is about 710. The product has an epoxy value of 0.27 eq./100 g.

*Polyether D*

By using a smaller ratio of epichlorohydrin to 2,2-bis(4-hydroxyphenyl)propane a glycidyl polyether of higher melting point was obtained. Thus, Polyether D was obtained in the same manner as Polyether C except that for every mole of 2,2-bis(4-hydroxyphenyl)propane, there was used 1.57 moles of epichlorohydrin and 1.88 moles of sodium hydroxide. This provided a product having a melting point of about 70° C., a molecular weight of 900 and an epoxide value of 0.20 eq./100 g.

Preferred members of the above-described group of polyepoxides are the glycidyl polyethers of the dihydric phenols, and especially 2,2-bis(4-hydroxyphenyl)propane, having an epoxy equivalency between 1.0 and 2.0 and a molecular weight between 300 and 900. Particularly preferred are those having a Durrans' Mercury Method softening point no greater than 60° C.

The glycidyl polyethers of polyhydric phenols obtained by condensing the polyhydric phenols with epichlorohydrin as described above, are also referred to as "ethoxyline" resins. See Chemical Week, vol. 69, page 27, for September 8, 1951.

Another group of polyepoxides that may be used to prepare the adducts comprise the glycidyl ethers of novalac resins which resins are obtained by condensing an aldehyde with a polyhydric phenol. A typical member of this class is the epoxy resin from formaldehyde 2,2-bis(5-hydroxyphenyl)propane novalac resin which contains as predominant constituent the substance represented by the formula

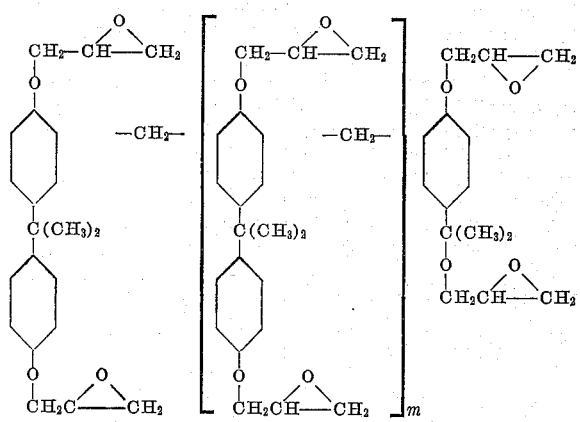

wherein *m* is a value of at least 1.0. For the nature and preparation of novalac resins, see the book by T. S. Carswell, Phenoplasts, 1947, page 29, et seq.

Another group of polyepoxides include the glycidyl polyethers of a polyhydric phenol which has two hydroxyaryl groups separated by an aliphatic chain of at least six carbon atoms in the chain and with the chain being attached by carbon-to-carbon bonding to a nuclear carbon atom of the hydroxyl aryl groups. Suitable phenols used for preparing these resins comprise those obtained by condensing phenol with a phenol having an aliphatic side chain with one or more olefinic double bonds positioned in the chain so the required separating atoms are present between two hydroxyphenol groups of the resulting polyhydric phenol. Cardanol, obtainable in known manner from cashew nut shell liquid, is a convenient source of phenols containing such side chain. Mixed grades of cardanol containing about equal amounts of m-(8-pentadecenyl) phenol and a phenol with a 15 carbon atom side chain having two double bonds similarly removed from the aromatic nucleus are available from the Irvington Varnish and Insulator Co.

A further group of polyepoxides comprises the polyepoxy polyethers obtained by reacting, preferably in the presence of an acid-acting compound, such as hydrofluoric acid, one of the aforedescribed halogen-containing epoxides with a polyhydric alcohol, and subsequently treating the resulting product with an alkaline component. As used herein and in the claims, the expression "polyhydric alcohol" is meant to include those compounds having at least two free alcoholic OH groups and includes the polyhydric alcohols and their ethers and esters, hydroxy-aldehydes, hydroxy-ketones, halogenated polyhydric alcohols, and the like. Polyhydric alcohols that may be used for this purpose may be exemplified by glycerol, propylene glycol, ethylene glycol, diethylene glycol, butylene glycol, hexanetriol, sorbitol, mannitol, pentaerythritol, polyallyl alcohol, polyvinyl alcohol, inositol, trimethylolpropane, bis(4-hydroxycyclohexyl) dimethylmethane, 1,4-dimethylolbenzene, 4,4'-dimethyloldiphenyl, dimethyloltoluenes, and the like. The polyhydric ether alcohols include, among others, diglycerol, triglycerol, dipentaerythritol, tripentaerythritol, dimethylolanisoles, beta-hydroxyethyl ethers of polyhydric alcohols, such as diethylene glycol, polyethylene glycols, bis(beta-hydroxyethyl ether) of hydroquinone, bis(beta-hydroxyethyl ether) of bisphenol, beta-hydroxyethyl ethers of glycerol, pentaerythritol, sorbitol, mannitol, etc., condensates of alkylene oxides, such as ethylene oxide, propylene oxide, butylene oxide, isobutylene oxide, glycidyl, epichlorohydrin, glycidyl ethers, etc., with polyhydric alcohols, such as the foregoing and with polyhydric thioethers, such as 2,2'-dihydroxydiethyl sulfide, 2,2'-3,3'-tetrahydroxy dipropyl sulfide, etc. The hydroxyaldehydes and ketones may be exemplified by dextrose, fructose, maltose, glyceraldehyde. The mercapto (thiol) alcohols may be exemplified by alphamonothioglycerol, alpha,alpha-dithioglycerol, etc. The polyhydric alcohol esters may be exemplified by monoglycerides, such as monostearin, monoesters of pentaerythritol and acetic acid, butyric acid, pentanoic acid, and the like. The halogenated polyhydric alcohols may be exemplified by the monochloride of pentaerythritol, monochloride of sorbitol, monochloride of mannitol, monochloride of glycerol, and the like.

The preparation of some of these polyepoxy polyethers may be illustrated by the following:

PREPARATION OF GLYCIDYL POLYETHERS OF POLYHYDRIC ALCOHOLS

*Polyether E*

About 276 parts (3 moles) of glycerol was mixed with 832 parts (9 moles) of epichlorohydrin. To this reaction mixture was added 10 parts of diethyl ether solution containing about 4.5% boron trifluoride. The temperature of this mixture was between 50° C. and 75° C. for about 3 hours. About 370 parts of the resulting glycerolepichlorohydrin condensate was dissolved in 900 parts of dioxane containing about 300 parts of sodium aluminate. While agitating, the reaction mixture was heated and refluxed at 93° C. for 9 hours. After cooling to atmospheric temperature, the insoluble material was filtered from the reaction mixture and low boiling substances removed by distillation to a temperature of about 150° C. at 20 mm. pressure. The polyglycidyl ether, in amount of 261 parts, was a pale yellow viscous liquid. It has an epoxide value of 0.671 equivalent per 100 grams and the molecular weight was 324 as measured ebullioscopically in dioxane solution. The epoxy equivalency of this product was 2.13. For convenience, this product will be referred to hereinafter as Polyether E.

Particularly preferred members of this group comprise the glycidyl polyethers of aliphatic polyhydric alcohols containing from 2 to 10 carbon atoms and having from 2 to 6 hydroxyl groups and more preferably the alkane polyols containing from 2 to 8 carbon atoms and having from 2 to 6 hydroxyl groups. Such products preferably have an epoxy equivalency greater than 1.0, and still more preferably between 1.1 and 4 and a molecular weight between 300 and 1000.

Another group of polyepoxides include the epoxy esters of polybasic acids, such as diglycidyl phthalate and diglycidyl adipate, diglycidyl tetrahydrophthalate, diglycidyl maleate, epoxidized dimethallyl phthalate and epoxidized dicrotyl phthalate.

Other polyepoxide compounds include the polymers and copolymers of the epoxy-containing monomers possessing at least one polymerizable ethylenic linkage, such as, for example, allyl glycidyl ether. When this type of monomer is polymerized in the substantial absence of alkaline or acidic catalysts, such as in the presence of heat, oxygen, peroxy compound, actinic light, and the like, they undergo addition polymerization at the multiple bond leaving the epoxy group uneffected. These monomers may be polymerized with themselves or with other ethylenically unsaturated monomer, such as styrene, vinyl acetate, methacrylonitrile, acrylonitrile, vinyl chloride, vinylidene chloride, methyl acrylate, methyl methacrylate, diallyl phthalate, vinyl allyl phthalate, divinyl adipate, chlorallyl acetate, and vinyl methallyl pimelate. Illustrative examples of these polymers include poly(allyl 2,3-epoxy-propyl ether), poly(2,3-epoxypropyl crotonate), allyl 2,3-epoxypropyl ether-styrene copolymer, methallyl 3,4-epoxybutyl ether-allyl benzoate copolymer, poly (vinyl 2,3-epoxypropyl ether), allyl glycidyl ether-vinyl acetate copolymer and poly(4-glycidyloxystyrene).

These polymers are preferably prepared by heating the monomer or monomers in bulk or in the presence of an inert solvent such as benzene in the presence of air or a peroxy catalyst, such as ditertiary-butyl peroxide, at temperatures ranging from 75° C. to 200° C.

The preparation of polymers of this type may be illustrated by the following example showing the preparation of poly(allyl glycidyl ether).

PREPARATION OF POLYMERS OF UNSATURATED GLYCIDYL ETHERS

*Polyether F*

About 100 parts of allyl glycidyl ether was heated at 155° C. in a glass flask and ditertbutyl peroxide added incrementally for 15 hours until 3% had been added. Excess monomer was removed, leaving 36 g. of polymer. The poly(allyl glycidyl ether) obtained as the resulting product had a molecular weight of about 481–542 and an epoxy value of 0.50 eq./100 g. and a viscosity of 15 poises. For convenience, this product will be referred to hereinafter as Polyether F.

Particularly preferred members of the above-described group comprise the polymers and copolymers of the 2-alkenyl glycidyl ethers having a molecular weight between 300 and 1000 and an epoxy equivalency greater than 1.0 and preferably between 1.2 and 6.0.

Of special interest are the polyepoxides containing no elements other than carbon, hydrogen, oxygen and chlorine.

The soluble adducts are formed by bringing together and mixing any one or more of the above-described polyamines whereupon chemical reaction between the two compounds begins. The primary reaction is the chemical coupling of the amine group to the epoxy group to form an amino-hydroxy group, such as

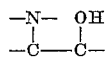

Although the coupling reaction between the polyepoxide and polyamine occurs upon bringing the reactants together at room temperature (15° C.–25° C.), it is in general preferred to heat the reaction mixture and at least complete the reaction at an elevated temperature. For this purpose, a temperature of about 50° C. to 150° C. is suitable. The reaction is usually effected under atmospheric pressure although superatmospheric pressure may be used especially with low boiling polyamines.

In order that the adducts will be obtained instead of a cured resinous mass, it is necessary that the proper proportions of reactants are utilized. The soluble fusible adduct is obtained when the polyepoxide is reacted with at least one mol of the polyamine for every epoxide equivalent weight of the polyepoxide. More preferably there is utilized from 1.5 to 3 mols of the polyamine per epoxide equivalent weight of the polyepoxide. Aside from matters of economy, there is no particular upper limit to the ratio. Only about one mol of amine actually reacts and chemically combines with one epoxide equivalent weight of the polyepoxide. The unreacted excess amine is then preferably separated and removed from the reaction product as completely as possible by usual methods, such as distillation or extraction. Where appropriate, steam distillation, vacuum pumping and purging with inert gas are used.

In view of the critical character of the proportions of reactants, it is preferred to add the polyepoxide to the polyamine. This prevents local regions of improper proportions of ingredients.

With polyepoxides which are very viscous or solid at ordinary temperature, the use of heat so as to have the polyepoxide in a mobile molten condition during mixing is desirable. The same is true with normally solid amines. It is also at times advantageous to effect the reaction in an inert organic solvent for the reactants and product. Dioxane and diethyl ether are particularly useful for this purpose.

The adducts prepared by the above-described method are viscous liquids to solid materials. They are soluble, i.e. they are soluble in solvents, such as dioxane, diethyl ether, methanol, acetone, chloroform and toluene. The adducts are also permanently fusible in that they do not harden and resinify upon being heated at say 50° C. to 100° C. for extended periods of time such as 24 hours.

The acids used in preparing salts of the above-described adducts may be inorganic or organic. The organic acids may be aliphatic, cycloaliphatic, aromatic or heterocyclic and may be saturated or unsaturated. Examples of the organic and inorganic acids include, among others, benzenesulfonic acid, toluenesulfonic acid, acetic acid, butyric acid, 2-ethylhexanoic acid, decanoic acid, octadecanoic acid, acrylic acid, methacrylic acid, cyclohexanoic acid, benzoic acid, toluic acid, nicotinic acid, fluosilicic acid, fluoboric acid, phosphoric acid, persulfuric acid, fluoberyllic acid, boric acid, hydrochlorous acid, iodic acid, periodic acid, selenious acid, arsenic acid, manganic acid, phosphorous acid and the like. Preferred acids are the aliphatic hydrocarbon monocarboxylic acids containing up to 18 carbon atoms, aromatic hydrocarbon monocarboxylic acids containing up to 12 carbon atoms, and inorganic acids, the anion portion of which contains at least two dissimilar elements having an atomic weight above 2, and more preferably inorganic acids of the formula $$H a[(X)_x(Z)_y]$$

wherein $X$ is a non-metal having an atomic weight above 2, $Z$ is an element which tends to gain 1 to 2 electrons, $x$ is an integer, $y$ is an integer greater than 1, and $a$ is equal to the valency of the radical $(X)_w(Z)_y$.

Particularly preferred acids, particularly when the salts are to be used in the treatment of the wool-containing fabrics, are the weak inorganic and organic acids, and particularly those having an ionization constant below $1 \times 10^{-3}$.

The salts of the adducts and the above-described acids are prepared by merely mixing the adduct with the acid. No external heat is applied and cooling to temperatures below 50° C. is preferably applied, particularly if the reaction is exothermic, so as to avoid formation of amides by chemical dehydration. Amides of the adducts are quite different products from the salts and lack the above-described superior properties as curing agents for polyepoxides.

The amount of acid added to the adduct should be sufficient to form at least one salt group between a mol of the acid and one amino group in the adduct, and preferably should be sufficient so as to reduce the pH of the adduct to at least 9. If the adducts are to be used in the treatment of the wool-containing fabrics, the acid is preferably added so as to neutralize the adduct. This may be accomplished by adding the acid until the composition has reached a pH of about 7.

The formation of the salt can be accomplished in the presence or absence of solvents or diluents. Suitable solvents that may be employed include those used for the formation of the adducts themselves, such as, for example, dioxane, diethyl ether, water, and the like.

The salts formed by the above process will vary from liquids to crystalline solids. They are soluble in water and some organic solvents, such as ethanol, dioxane, diethyl ether and the like.

As indicated above, the salts are particularly useful and valuable as curing agents for polyepoxides. In this application, the salt is mixed with the polyepoxides and the mixture heated to temperatures at least about 50° C. and preferably between 100° C. and 200°C to effect the cure, the salts are employed in amounts varying from about .1% to 30% by weight of the polyepoxide and more preferably from 1% to 20% by weight of the polyepoxide. The salts are effective curing agents for any of the above-described polyepoxides used in preparing the adducts.

Although not essential, it is generally preferred to effect the mixing of the curing salt with the polyepoxide in water or a suitable solvent. Solvents that may be used are those which dissolve the polyepoxides, such as acetone, methyl ethyl ketone, isophorone ethyl acetate, butyl acetate, Cellosolve acetate, ether alcohols, such as methyl, ethyl or butyl ether of ethylene glycol, chlorinated solvents, such as trichloropropane, chloroform, etc. To save expense, sometimes these active solvents are used in admixture with diluents which are themselves not solvents when used alone but which may be incorporated with the active solvent. Materials of this type may be exemplified by benzene, toluene, xylene, aromatic petroleum thinner, etc. and alcohols as ethyl alcohol, butyl alcohol, and the like.

When used as film-forming materials, the compositions containing the polyepoxide and the salt curing agents may contain various other materials, such as pigments, plasticizers and other resins.

As indicated, the salts are particularly effective as curing agents in the treatment of fabrics, and especially wool-containing fabrics, to reduce their tendency to shrink and to improve their water repellency. This may be accomplished by applying an aqueous medium containing the polyepoxide, and the above-described salt as curing agent, to the fabric and then heating the impregnated fabric to effect the cure.

The polyepoxide used in the treatment of the wool is preferably a polyether polyepoxide, i. e. a material possessing at least two ether oxygen linkages (i.e. —O— linkages) and at least two epoxy linkages. Examples of these materials may be found in the list of examples given for the polyepoxides used in making the soluble fusible adducts.

In preparing the aqueous impregnating solution, one may add the polyepoxide and salt curing agent direct to the water, or if the polyepoxide and/or salt curing agent do not have sufficient water-solubility, one may employ aqueous mediums containing organic solvents or emulsifying agents.

Emulsifying agents employed may be exemplified by monooleate of sorbitan polyoxyethylene, the trioleate of sorbitan polyoxyethylene, sorbitan tristearate, sorbitan monolaurate, polyoxyethylene esters of alkylphenols, carboxymethylcellulose starch, gum arabic, polyvinyl alcohol, aryl and alkylated aryl sulfonates, such as cetyl sulfonate, oleylate sulfonate, sulfonated mineral oils, copolymers of vinyl methyl ether, maleic anhydride and the like, and mixtures thereof. The emulsifying agents are generally employed in amounts varying from 0.1% to 10% by weight and more preferably from .1% to 5% by weight.

The amount of the polyepoxide in the impregnating solution may vary over a considerable range depending chiefly on the amount of resin to be deposited on the fabric and this, in turn, will depend on the number of applications and the pick-up allowed per application. When the solution is applied but once, with a wet pick-up of 65% to 125% pick-up by weight of the fabric in the dry state, a concentration ranging from 3% to 25% by weight will ordinarily suffice. If less than 65% pick-up is permitted, the concentration may in some cases go as high as 30% to 50%.

The amount of the salt curing agent used in the impregnating solution will vary from about 5% to 40% by weight of the polyepoxide and more preferably from about 10% to 30% by weight of the polyepoxide.

The aqueous medium employed to treat the textiles may also contain plasticizers to improve flexibility of the treated fabric although these should not be present in such proportions as to render the finished materials soft or sticky at temperatures and humidities to which they would be so exposed. It is found, however, that the substances employed in the present invention yield products which are sufficiently flexible for most purposes without the use of plasticizers. Among plasticizers that may be used according to the present invintion may be mentioned organic and inorganic derivatives of phenols, for example, diphenylol propane and triphenyl and tricresyl phosphates, sulphonamides, sulphonarylides, alkyl phthalates, for examples, diethyl phthalate and glycol phthalates, diethyl tartarate, derivatives of polyhydric alcohols, for examples, mono-, di- and tri-acetin, and products obtained by condensing polyhydric alcohols with themselves or with aldehydes or ketones. The compositions may also contain natural resins, e.g., shellac, resin, and other natural resins and synthetic or semi-synthetic resins, e.g., ester gum, polyhydroxypolybasic alkyd resins, phenol aldehyde and urea-aldehyde resins.

Textile softening agents may also be added in varying amounts to improve the feel of the treated fabrics. Examples of these agents include, among others, epoxidized glycerides, such as epoxidized soybean oil, glycidyl octadecyl ether, pentadecyl phenol, octadecyl succinic acid, octodecenyl succinic acid, sulfonated waxes and sulfonated alcohols, dimerized long-chain unsaturated acids, non-ionic fatty acid esters of higher polyglycols. Preferred softeners are the epoxidized tri- and diglycerides.

The application of the solution containing the polyepoxide to the wool-containing fabric may be effected in any suitable manner. It is generally preferred to impregnate the fabric by simply dipping it in the solution and running it through conventional-type padding rollers.

The amount of the polyepoxides to be deposited on the fabric will vary over a wide range depending upon the degree of shrink-resistance desired in the finished material. If the fabric is to have a soft feel, such as that intended for use for dresses, shirts, etc., the amount of polyether polyepoxide deposited will generally vary from 3% to 20% by weight of the fabric. If stiffer materials are required, such as for shoe fabrics, draperies, etc., still higher amounts of resins, such as of the order of 25% to 50% by weight may be deposited.

If the desired amount of the polyepoxide deposited in the fabric is not obtained in one application, the solution can be applied again or as many times as desired in order to bring the amount of the polyepoxide up to the desired level.

After the desired amount of solution has been applied to the fabric, the treated fabric is preferably dried for a short period to remove some or all of the dispersing liquid, such as water, alcohol, and the like. This accomplished by framing the fabric to original dimensions and exposing the framed fabric to elevated temperatures for a few minutes. Drying time will depend largely on the amount of pick-up permitted during the application of the solution and the concentration of the polyepoxide. In most instances, drying periods of from 1 to 30 minutes should be sufficient.

The framed fabric is then exposed to relatively high temperatures to accelerate the cure of the polyepoxides. Temperatures used for this purpose generally range from 75° C. to 200° C., and more preferably, from 80° C. to 190° C. At these preferred temperature ranges the cure can generally be accomplished in from 1 to 60 minutes. At lower temperature, e.g. 80° C., 30 minutes may be required, while at higher temperature, e.g. 180° C., the cure can be accomplished in about 1 minute. Exposures of less than 3 minutes, e.g., 1 minute, may probably be used in continuous, commercial processing.

The process of the invention may be applied to the treatment of fabric but is particularly effective with wool-containing fabrics. Such materials include wool as well as fabrics containing wool and other materials such as cotton, linen, natural silk and artificial silk, such as the artificial silk obtained from cellulose acetate or other organic esters of ethers of cellulose and the regenerated cellulosic type of artificial silk obtained by the viscose, cuprammonium or nitrocellulose process, jute, hemp, rayon, animal fibers, hair, mohair, and the like, and mixtures thereof. Fabrics comprising blends of wool and new synthetic fabrics, as nylon and the like may also be used in the process. The above mixtures preferably contain at least 40% wool. While the invention has been particularly described with relation to woven fabrics, it may also be applied to other materials, for example, fibers, knitted or netted fabrics. The fabrics may be white or colored.

The materials treated according to the process of the invention will have excellent shrink resistance as well as good water repellency. The woven wool fabrics, both colored and white, containing conventional amounts of resin, e.g., from 3% to 25% by weight, may be used, for example, in the preparation of soft goods, such as skirts, dresses, shirts, coats, and the like, while the fabrics containing much larger amounts of the resin, e.g., 25% to 50% may be used in other applications demanding more crispness and fullness as in the preparation of rugs and carpets.

To illustrate the manner in which the invention may be carried out, the following examples are given. It is to be understood, however, that the examples are for purpose of illustration and the invention is not to be regarded as limited to any of the specific materials or conditions recited therein. Unless otherwise indicated, parts disclosed in the examples are parts by weight.

EXAMPLE I (A) This example illustrates the preparation and properties of a salt of acetic acid and an adduct of Polyether A (prepared as shown above) and diethylene triamine.

100 parts of Polyether A above (epoxy value of 0.50 eq./100 grams) was combined with 102 parts of diethylene triamine in 100 parts of dioxane. A slightly exothermic reaction ensued and the mixture was stirred and heated to reflux where it was held for 3 hours. The reaction mixture was then stripped of unreacted amine and dioxane. The resulting product was a soluble adduct having a molecular weight of 526.

Acetic acid was then slowly added to the above adduct at 20–25° C. until a pH of 7 was obtained. The resulting product was a light brown viscous liquid identified as a neutral salt of acetic acid and the triethylene diamine-polyether A adduct.

(B) The use of the above salt as a curing agent for polyepoxides is demonstrated by the following. 15 parts of the salt was added to 100 parts of Polyether A and the mixture spread on steel panels and baked at 100° C. At the end of that period, the coating had been converted to a hard chemical resistant film.

The long pot life of the combination is demonstrated by the following. A combination of 15 parts of the salt and 100 parts of polyether was allowed to stand at room temperature. At the end of the 68 hours, the mixture had still not set up and could be used to form a hard film as indicated in the previous paragraph. A similar composition containing diethylene triamine alone set up in 2 hours.

(C) This part of the example illustrates the use of the salt in treating wool-containing fabrics.

64 parts of Polyether A was combined with 6.4 parts of a polyethylene glycol ether of sorbitan monopalmitate at 100° C. 64 parts of a 5% solution of polyvinyl alcohol and 16 parts of the acetic acid salt of a triethylene diamine-polyether A adduct prepared as shown above were then added and additional water added to bring the solution up to 800 parts.

Wool flannel cloth was impregnated with the above solution by means of a Butterworth 3-roll laboratory padder. The cloth after padding showed a 100% weight pick-up. The impregnated cloth was then framed to original dimensions and dried for seven minutes at 100° C. and then cured on the frame for 30 minutes at 82° C. The treated cloth had a soft feel, good hand, outstanding shrink resistance and improved water repellency.

The excellent shrink resistance is demonstrated by the following. The treated cloth was washed in an automatic washer using 10 parts of concentrated ammonia and 10 parts of alkylaryl polyether alcohol for 6 minutes at 160° F. After washing the cloth was rinsed and tumbled dried for 3 minutes in a drier. The cloth was then ironed flat pad press without tension. The treated cloth after one laundering showed a 1.5% shrinkage, after five launderings showed a 1.4% shrinkage and after 25 washes showed 1.8% shrinkage. An untreated cloth showed a 5.2% shrinkage after the first laundering, a 14.2% shrinkage after five launderings and after 25 washes 40% shrinkage. Wool fabric treated in the same manner with this solution after it had aged for 140 hours showed shrinkages of 1.0%, 1.0%, 2.0% after 1, 5, and 25 washes.

(D) This part of the example illustrates the use of the acetic acid salt of the triethylene diamine Polyether A adduct as a curing agent for the treatment of wool using Polyether E.

100 parts of Polyether E described above was combined with 5 parts of a polyglycol fatty acid ester emulsifier and 100 parts of water. The mixture was stirred and then 50 parts of 5% solution of a polyvinyl alcohol, 25 parts of the above-described acetic acid salt of the triethylene diamine Polyether A adduct and additional water added to bring the solution to 1250 parts.

Light wool flannel cloth was impregnated with the above-described solution as shown in B. The impregnated cloth was framed to original dimensions, dried for seven minutes at 100° C. and then cured on the frame for 5.5 minutes at 160° C. The treated cloth had a soft feel, good hand, excellent shrink resistance and improved water repellency. The cloth had a shrink resistance of 1.5% after one wash, 1.7% after 5 washes and 2.2% after 25 washes as compared to a shrinkage of 5.2%, 14.2% and 40% after 1, 5, and 25 washes for untreated cloth.

Wool treated with the above solution after it had aged 72 hours had shrinkage of 1.1%, 1.6% and 2.2% after 1, 5, and 25 washes.

(E) Neutral salts that have related properties as curing agents for Polyether A as shown in B, C, and D above are obtained by replacing the acetic acid in (A) above with each of the following: formic acid, propionic acid, butyric, isobutyric, valeric, isovaleric and caproic acid.

EXAMPLE II (A) This example illustrates the preparation and use of an acetic acid salt of an adduct of diethylene triamine and Polyether E.

100 parts of Polyether E (epoxy value 0.671 eq./100 g.) and 136 parts of diethylene triamine were combined in 100 parts of dioxane. This mixture was heated to reflux and held there for three hours. The reaction mixture was then stripped of unreacted amine and dioxane to yield the desired adduct. Acetic acid was added to this adduct at 20° C. to 25° C. until the composition had a pH of about 7. The product which was a light brown liquid was identified as the acetic acid salt of a diethylene triamine in Polyether E adduct.

(B) This part of the example illustrates the use of the above-described acetic acid salt as a curing agent in the treatment of wool with Polyether A.

64 parts of Polyether A was combined with 6.4 parts of a polyethylene glycol ether of sorbitan monopalmitate at 100° C. 64 parts of a solution of polyvinyl alcohol and 16 parts of the above-described acetic acid salt were then added and additional water added to bring the solution up to 800 parts.

Light wool flannel cloth was then impregnated with the above-described solution by means of a Butterworth 3-roll laboratory padder. The impregnated cloth was framed to original dimensions and dried for 7 minutes at 100° C., and then cured on the frame for 30 minutes at 82° C. The treated cloth had a soft feel, good hand, outstanding shrink resistance and improved water repellency.

(C) This part of the example illustrates the use of the above-described acetic acid salt of the adduct of Polyether E and diethylene triamine as a curing agent in the treatment of wool with Polyether E. 100 parts of Polyether E was combined with emulsifier as shown in Example I(D) above and then 15 parts of the above-described acetic acid salt was added to this solution and additional water added to bring the total up to 1250 parts.

Light wool flannel cloth was then impregnated with the above-described solution and the impregnated cloth framed to original dimensions, dried for 7 minutes at 100° C. and then cured on the frame for 30 minutes at 82° C. The treated cloth had a soft feel, good hand, and excellent shrink resistance.

(D) Salts having related properties as curing agents for Polyether A and Polyether E as described in (B) and (C) above are obtained by replacing the acetic acid in (A) with each of the following: caproic acid, 2-ethylhexonic acid and decanoic acid.

EXAMPLE III (A) This illustrates the preparation and use of a fluoboric acid salt of an adduct of diethylene triamine and Polyether A.

A soluble adduct of Polyether A and diethylene triamine were prepared as in Example 1(A). Fluoboric acid was then added to the adduct at a temperature of 20-25° C. so as to form a composition having a pH of about 7. The resulting salt was a viscous syrup.

(B) 64 parts of Polyether A were combined with 6.4 parts of a polyethylene glycol ether of solution monopalmitate at 100° C. The mixture was stirred and then 64 parts of a 5% solution of polyvinyl alcohol and 16 parts of the above-described fluoboric acid salt were added and additional water added to bring the solution up to 800 parts.

Light wool flannel cloth was then impregnated with the above-described solution as indicated in the preceding example. The impregnated cloth was framed and dried at 100° C. and then cured for 5.5 minutes at 160° C. The treated cloth had a soft feel, good hand, outstanding shrink resistance and improved water repellency.

(C) Related results are also obtained by replacing fluoboric acid in (A) above with each of the following: fluosilicic acid, phosphoric acid and fluoberyllic acid.

(D) Related results are also obtained by replacing Polyether A in (B) above with each of the following: Polyether B, Polyether E and Polyether F.

EXAMPLE IV (A) This example illustrates the preparation and use of a butyric acid salt of an adduct of ethylene diamine and Polyether A.

100 parts of Polyether A and 30 parts of ethylene diamine were combined in 100 parts of dioxane. This mixture was heated to reflux and held there for three hours. The reaction mixture was stripped of the unreacted amine and dioxane.

Butyric acid was then added to the above adduct until the combination had a pH of about 9. The resulting salt was a light brown viscous syrup.

(B) An emulsion of 100 parts of Polyether A and 15 parts of the above-described salt was prepared and then applied to wool flannel as indicated above. The treated cloth had soft feel, good hand, and excellent shrink resistance.

EXAMPLE V (A) 100 parts of Polyether C (epoxy value of 0.27 eq./100 g.) dissolved in 100 parts of xylene are combined with 51 parts of diethylene triamine. This mixture is stirred and heated to 60° C. for several hours. The reaction mixture is then stripped of unreacted amine and solvent. The resulting product is then combined with acetic acid at 20-25° C. to bring the pH to 9. The resulting product is a viscous syrup identified as the acetic acid salt of the diethylene triamine-Polyether C adduct.

(B) A clear coating composition is prepared by combining 100 parts of Polyether C with 24 parts of the above-described salt in a solvent containing xylene and Cellosolve acetate. This composition is applied on steel panels and cured at 100° C. to form a hard, solvent resistant film.

(C) Salts having related properties as curing agents are obtained by replacing the diethylene triamine in (A) above with equivalent amounts of each of the following: hexamethylene diamine, p-phenylene diamine and 1,8-octanediamine.

(A) A soluble adduct of Polyether A and diethylene triamine is prepared as in Example I(A). Benzenesulfonic acid is then added to the adduct at 20-25° C. to form the sulfonic acid salt of the Polyether A-diethylene triamine adduct.

(B) A clear coating composition is prepared by combining 100 parts of Polyether C with 10 parts of the above-described salt in a solvent containing xylene and Cellosolve acetate. This composition is applied on steel panels and cured at 100° C. to form a hard, solvent resistant film.

I claim as my invention:

1. A process for treating a wool containing fabric to reduce its tendency to shrink and to improve its water repellency which comprises impregnating the fabric with an aqueous solution containing a polyether polyepoxide having a plurality of

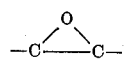

groups, a minor amount of an acetic acid salt of an acetone-soluble adduct of a di-glycidyl ether of a polyhydric phenol and a diamine having as the only reactive groups a pair of amino groups at least one of which is primary and an emulsifying agent, drying the treated fabric at a temperature between 75° C. and 200° C. for a few minutes so as to cure the polyether polyepoxide in the fibers of the fabric.

2. A process for treating a wool containing to reduce its tendency to shrink and improve its water repellency which comprises impregnating the fabric with an aqueous medium containing a polyether polyepoxide having the plurality of

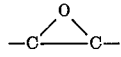

groups, and a salt of a weak acid having ionization constant below $1 \times 10^{-3}$ and an acetone soluble adduct of a polyepoxy having a plurality of

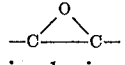

groups and a polyamine having a plurality of amino groups at least one of which is primary, and drying the treated fabric at a temperature between 75° C. and 200° C. to cure the polyether polyepoxide in the fibers of the fabric.

References Cited in the file of this patent

UNITED STATES PATENTS

| | | |
|---|---|---|
| 2,500,600 | Bradley | Mar. 14, 1950 |
| 2,640,037 | Parry et al. | May 26, 1953 |
| 2,651,589 | Shokal et al. | Sept. 8, 1953 |
| 2,681,901 | Wiles et al. | June 22, 1954 |
| 2,772,248 | Lieberman et al. | Nov. 27, 1956 |
| 2,801,229 | De Hoff et al. | July 30, 1957 |